United States Patent [19]
Egawa

[11] Patent Number: 5,774,284
[45] Date of Patent: Jun. 30, 1998

[54] INFORMATION REPRODUCTION APPARATUS FOR A CAMERA

[75] Inventor: Akira Egawa, Kawasaki, Japan

[73] Assignee: Canon Kabushiki Kaisha, Tokyo, Japan

[21] Appl. No.: 420,804

[22] Filed: Apr. 12, 1995

Related U.S. Application Data

[62] Division of Ser. No. 913,819, Jul. 16, 1992, Pat. No. 5,438,461.

[30] Foreign Application Priority Data

Jul. 19, 1991 [JP] Japan .................................. 3-203645
Jul. 19, 1991 [JP] Japan .................................. 3-203650
Jul. 19, 1991 [JP] Japan .................................. 3-203656

[51] Int. Cl.$^6$ .............................. G11B 5/00; G11B 5/09
[52] U.S. Cl. ................................... 360/1; 360/51; 360/53
[58] Field of Search .............................. 360/1, 3, 51, 53

[56] References Cited

U.S. PATENT DOCUMENTS 4,965,575 10/1990 Wash .................................... 360/51 X
5,006,873 4/1991 Wash ..................................... 360/1 X Primary Examiner—Aristotelis M. Psitos
Assistant Examiner—Alan Faber
Attorney, Agent, or Firm—Fitzpatrick, Cella, Harper & Scinto

[57] ABSTRACT

Magnetic reproduction apparatus for a camera is capable of preventing any signals from being output as correctly reproduced signals if there is any error in reading out the magnetic record or of outputting correctly reproduced signals at all times even if there is any error in reading out the magnetic record.

6 Claims, 16 Drawing Sheets

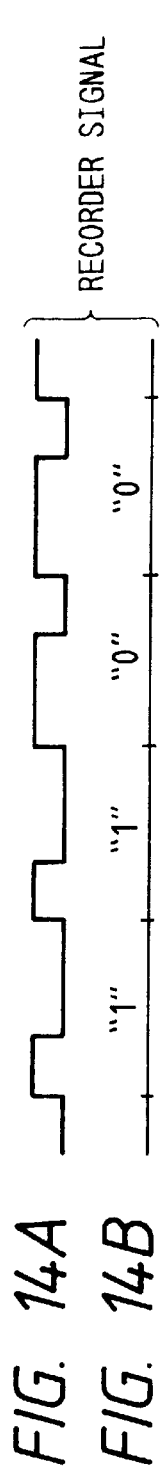
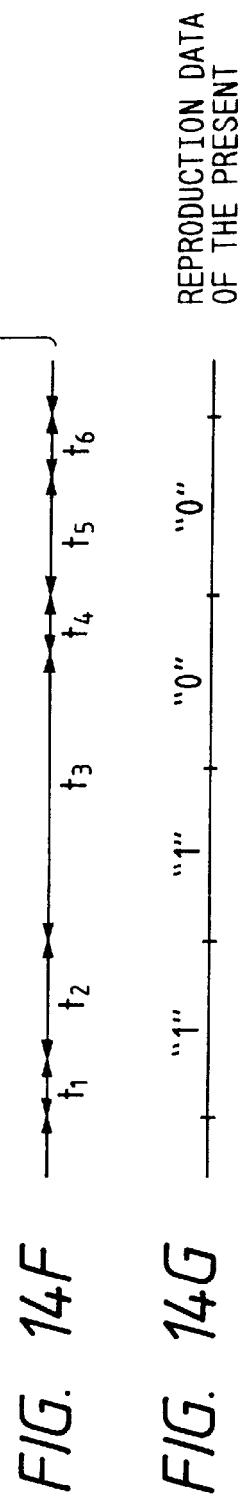
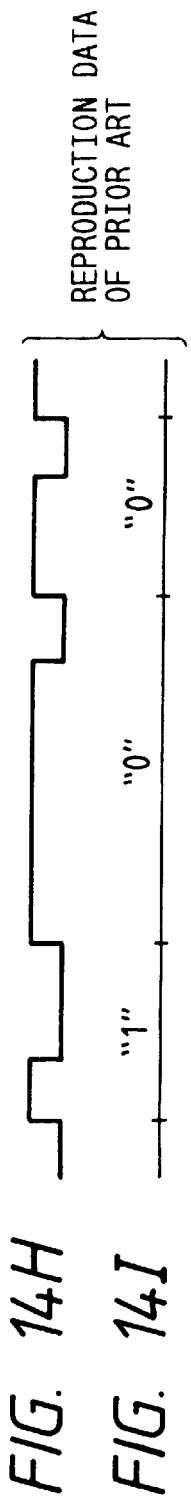
FIG. 14A
FIG. 14B
FIG. 14C
FIG. 14D
FIG. 14E
FIG. 14F
FIG. 14G
FIG. 14H
FIG. 14I

INFORMATION REPRODUCTION APPARATUS FOR A CAMERA

This application is a division of application Ser. No. 07/913,819 filed Jul. 16, 1992, now U.S. Pat. No. 5,438,461.

BACKGROUND OF THE INVENTION

1. Field of the Invention

The present invention relates to an improvement in the magnetic reproduction apparatus of a camera which is provided with data edge detecting means to detect the data edge being read out from a magnetic head, clock edge detecting means to detect the clock edge being read out from the magnetic head, and magnetic reproducing means to give data on the basis of the detected clock edge and data edge, and time interval from the data edge to the next clock edge, and thus output the data as the reproduction signals.

2. Related Background Art

There has been proposed hitherto a camera capable of allowing film data such as a film speed, and photographic information such as the data of a photograph taken, to be written by a magnetic head into or if required, read out from the magnetic storage provided for the film in U.S. Pat. No. 4,864,332.

Also, a method of magnetic recording by a self-clocking system has been proposed in U.S. Pat. No. 4,912,467 and a method of reproduction, in U.S. Pat. No. 4,876,697, respectively.

In the above-mentioned conventional examples, however, it is impossible to set a large S/N ratio at the time of reproducing information due to the inevitably small density of the magnetic layer which is needed to form its magnetic recording portion without causing any damage on the transmitting capability of the film.

In addition, the feeding of a film for a camera has not been given any thought to providing the magnetic reproduction originally. Thus, if a film feeding speed fluctuates greatly for the conditions of its power source or the load of film feeding thus delaying the film feed, the output of the reproduction signals becomes smaller.

Also, noises from the motor and the like affect the S/N ratio of the reproduction signals greatly.

Therefore, at the time of information reproduction, the clock edge and data edge are sometimes caused to be omitted, resulting in the output of an erroneously reproduced signals, because of the missing one bit out of a series of information which should otherwise be represented by eight bits, for example.

SUMMARY OF THE INVENTION

In consideration of the above-mentioned problems, one aspect of the application is to provide a magnetic reproduction apparatus for a camera capable of preventing any signals from being output as correctly reproduced signals if there is any error in reading out the magnetic record or of outputting correctly reproduced signals at all times even if there is any error in reading out the magnetic record.

One aspect of the application is to provide an apparatus in which discriminating means is arranged in magnetic reproduction means for discriminating detection errors, thus enabling any error to be notified when the clock edge is detected.

Also, in the magnetic reproduction means, there are further provided storage means for storing time intervals between the last clock edge and the clock edge, and data restoring means for defining data on the basis of the stored time intervals in the aforesaid storage means when any detection error is discriminated by the discriminating means, thus producing the clock edge as has been obtained at the time of its clock edge error detection being correctly performed, and on the clock edge thus produced, the data is established.

One aspect of the application is to provide an apparatus in which there are further provided discriminating means for discriminating data detection errors for the data edge detecting means, and information setting-up means for setting up the information which is regarded as unsettled when a detection error is discriminated for data edge by the aforesaid discriminating means.

The discriminating means discriminates the detection error for the data edge if the next clock edge comes again instead of the data edge which should have come as anticipated. If any detection error results from this discrimination information is set up as the one which is re-regarded as unsettled. Thus, with the parity check to be executed later, it is intended that the data will be restored.

Also, when only a clock edge or a data edge is omitted, this omission can be detected by the fact that the edges of one side will be generated in succession, respectively. However, in a case where the respective edges of clock and data or data and clock are omitted, no detection is possible in the manner described above, and the reproduction errors take place.

In consideration of the above-mentioned problems, one aspect of the application is to provide further a magnetic reproduction apparatus for a camera capable of outputting reproduction signals with fidelity to the recorded information even if there are plural-bit errors in reading out the recorded information.

One aspect of the application is to provide an apparatus in which there are provided in the magnetic reproduction means, counting means for counting the time intervals between clocks, storage means for storing the time intervals between the clocks for the last bit, discriminating means for comparing the currently counted value and the value which is predetermined times the counted value stored in the aforesaid storage means thereby to discriminate any missing bit if the current value is found to be greater, and information set-up means for setting up information as the one which is regarded as unsettled when any missing bit is discriminated by the aforesaid discriminating means.

The discriminating means discriminates the missing bit when the counted value between the current clocks is greater than the counted value between the last clocks, and if any missing bit is discriminated by this discriminating means, the information is recorded as unsettled so that the restoration of the data can be executed by a parity check to be conducted later.

BRIEF DESCRIPTION OF THE DRAWINGS

FIGS. 14A to 14I are timing charts for the data reproducing processes in FIG. 12 and FIG. 13.

DETAILED DESCRIPTION OF THE PREFERRED EMBODIMENTS

Figure 1:
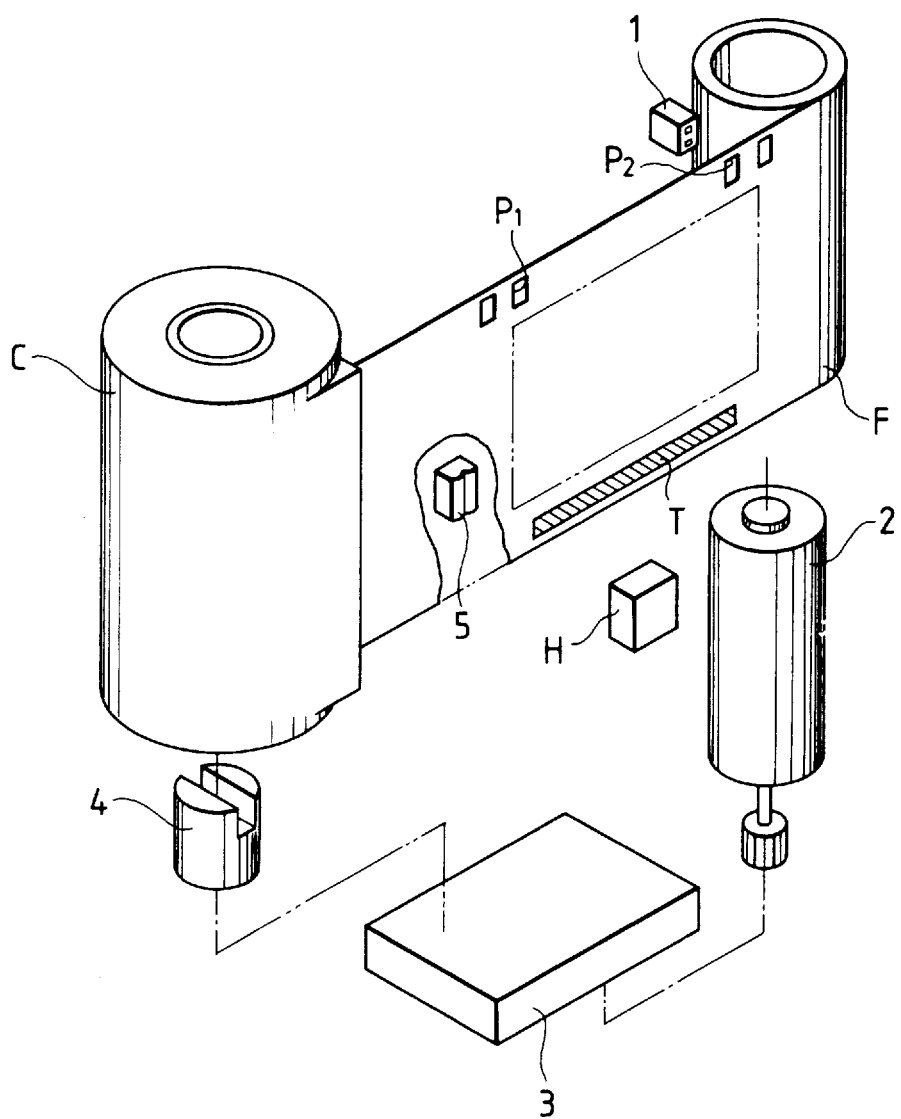
FIG. 1 is a perspective view showing the structure of the main part of a camera according to the present invention.
Figure 2:
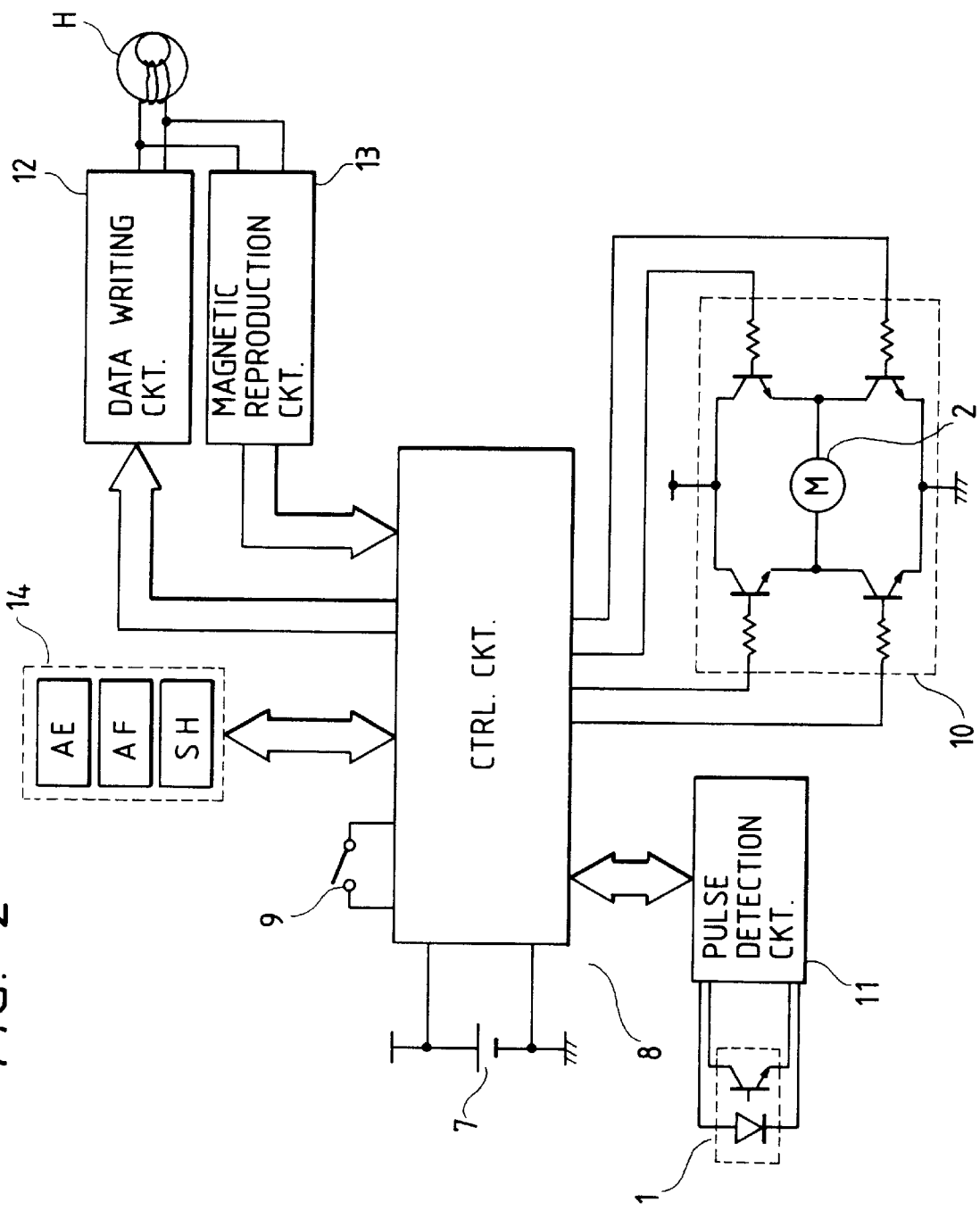
FIG. 2 is a block diagram schematically showing the structure of a camera according to the present invention.

FIG. 1 is a view schematically showing the inner structure of a camera according to the present invention. FIG. 2 is a block diagram showing the circuits for the camera.

In FIGS. 1 and 2, a reference numeral 1 designates a photoreflector for feeding which detects the perforations P1 and P2 of a film F coated with a magnetic layer on its base side and then outputs signals when the film F is fed for a given distance; 2, a film feeding motor installed in the film winding spool; 3, gear trains for reducing speeds and conducting the switch over of winding up and rewinding; and 4, a fork. A reference mark C designates a film cartridge; T, a recording track (magnetic storage) for recording the exposure conditions, frame numbers, and other data as magnetic information; and H, a magnetic head for writing information onto the recording track T on the film f or reading the recorded information therefrom. Now, a reference numeral 5 designates a compressing part which presses the film F against the magnetic head H.

A reference numeral 7 designates a battery to drive the entire system; 8, a control circuit to control the microcomputer and others which perform the control on the entire system driving; 9, a release switch to allow the photographing operation to be started; 10, a feed circuit to wind up the film F and rewind it; 11, a pulse detection circuit to convert the signals output from the feed photoreflector 1 into the signals acceptable by the control circuit 8; 12, a data writing circuit to transmit by the magnetic head H the signals for recording the photographic data to the recording track T on the film F; 13, a magnetic reproduction circuit to process the signals read out by the magnetic head H and output them to the control circuit 8 as reproduction signals; and 14, known AE, AF, SH circuits for the photometry, metering, and photographic operation.

Figure 3:
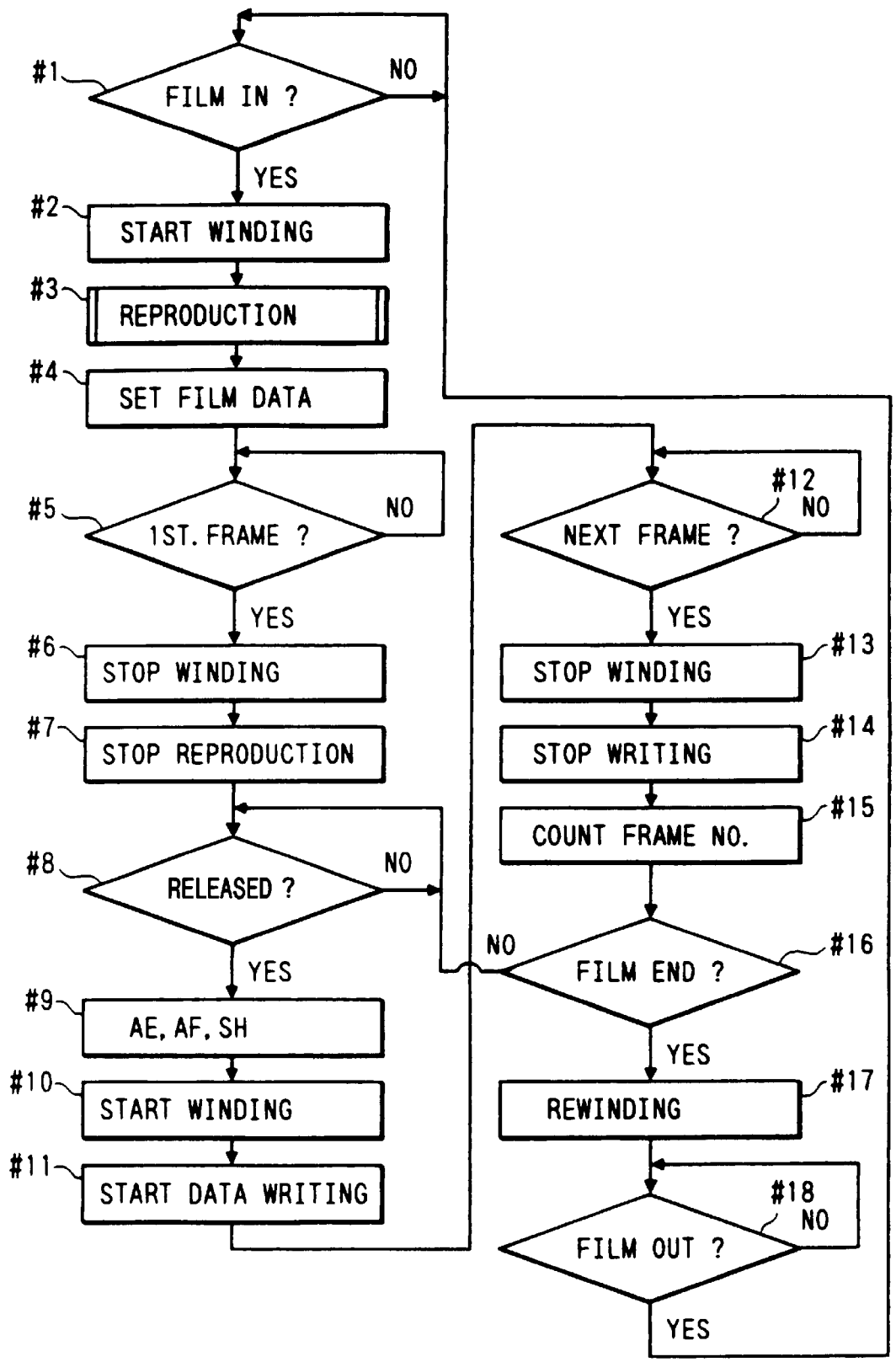
FIG. 3 is a flowchart showing the operation of the control circuit shown in FIG. 2.

FIG. 3 is a flowchart showing the operation of the above-mentioned control circuit 8. When the battery 7 is turned on, the operation is started with step 1.

Step 1: By a switch (not shown) for detecting the presence of film, whether the film cartridge C is loaded or not is determined. If the cartridge is found to be loaded, the process will proceed to step 2.

Step 2: The film feeding motor 2 is driven through the feed circuit 10 to start winding up the film F.

Step 3: The magnetic information which has been recorded in advance on the recording track T of the film F, such as the film speed and regulated frame number, is reproduced by the magnetic head H and magnetic reproduction circuit 13. In this respect, the operation here will be described in conjunction with FIG. 4 later.

Step 4: The bit information thus reproduced is converted into the film speed and regulated frame number, which will be given to the camera for setting.

Step 5: The perforation signal detected by the photoreflector 1 is inputted through the pulse detection circuit 11 thus discriminating whether the first frame of the film for photographing has arrived at the aperture position or not. If it is found to have arrived at the position, the process will proceed to step 6.

Step 6: The driving of the above-mentioned film feeding motor 2 is suspended through the feed circuit 10 to stop winding up the film F.

Step 7: The information reproduction by the magnetic head H and magnetic reproduction circuit 13 is suspended.

Step 8: Whether the release switch 9 is turned on or not is discriminated. If it is found to be turned on, the process will proceed to step 9.

Step 9: The AE, AF, and SH circuits 14 are driven to perform the known photometry, metering, and photographic operation. In other words, a series of the photographic operations will be performed.

Step 10: The film feeding motor 2 is driven through the feed circuit 10 to start winding up the one frame of the film F.

Step 11: Here, the magnetic head H and magnetic reproduction circuit 13 are driven to start writing the photographic information such as the date of photography, shuttering seconds, and aperture stop value on the storing track T of the film F which is being fed.

Step 12: The perforation signal detected by the photoreflector 1 is inputted through the pulse detection circuit 11 to discriminate whether the second frame has arrived at the aperture position or not. If it is found to have arrived at the position, the process will proceed to step 13.

Step 13: The driving of the above-mentioned film feeding motor 2 is suspended through the feed circuit 10 to stop winding up the film F.

Step 14: The information reproduction by the magnetic head H and magnetic reproduction circuit 13 is suspended.

Step 15: The frame number is counted up.

Step 16: The regulated film frame number set up in the aforesaid step 4, that is, the maximum frame number, and the current frame number after the number counted up in the aforesaid step 15 are compared, and if the current frame number is found not yet to have reached the maximum frame number, the process will return to the step 8 to repeat the same operations. Also, if the current frame number is found to have reached the maximum frame number, the process will proceed to step 17.

Step 17: Here, the film feeding motor 2 is driven in the reverse direction through the feed circuit 10 to rewind the film F.

Step 18: Whether the film cartridge C has been removed from the camera or not is determined according to the state of the switch (not shown) for detecting the presence of FIG. 1. If it is found to have been removed, the process will return to the step 1.

First Embodiment

Now, in FIGS. 6A to 6I, the first embodiment and the prior art are compared with regard to the recording signals and there are represented in it the waveforms in each of the processes from the signals being read out by the magnetic head H to the signals being output as the reproduction signals.

FIG. 6C shows a signal read out by the magnetic head H from the recording track T of the film F. This signal is the signal which has been written as shown in FIG. 6A at the time of recording. As shown in FIG. 6B, the positive side in FIG. 6C corresponds to the clock edge while the negative side corresponds to the data edge for this recorded information, and to which of the clock edges the respective data edges are closer, front or near, "1" or "0" is registered.

FIGS. 6D and 6E are views showing the state that the peaks of the positive side and negative side in FIG. 6C are detected in the magnetic reproduction circuit 13. The broken line at $c_3'$ in FIG. 6D indicates that the peaks in FIG. 6C are too small to be detected.

Also, FIG. 6F represents the counted values used for specifying that the data is "1" or "0". FIG. 6G represents the reproducing outputs in the present embodiment, and FIGS. 6H and 6I represent the reproducing outputs in a prior art when the signal as shown in FIG. 6C is read.

Figure 6:
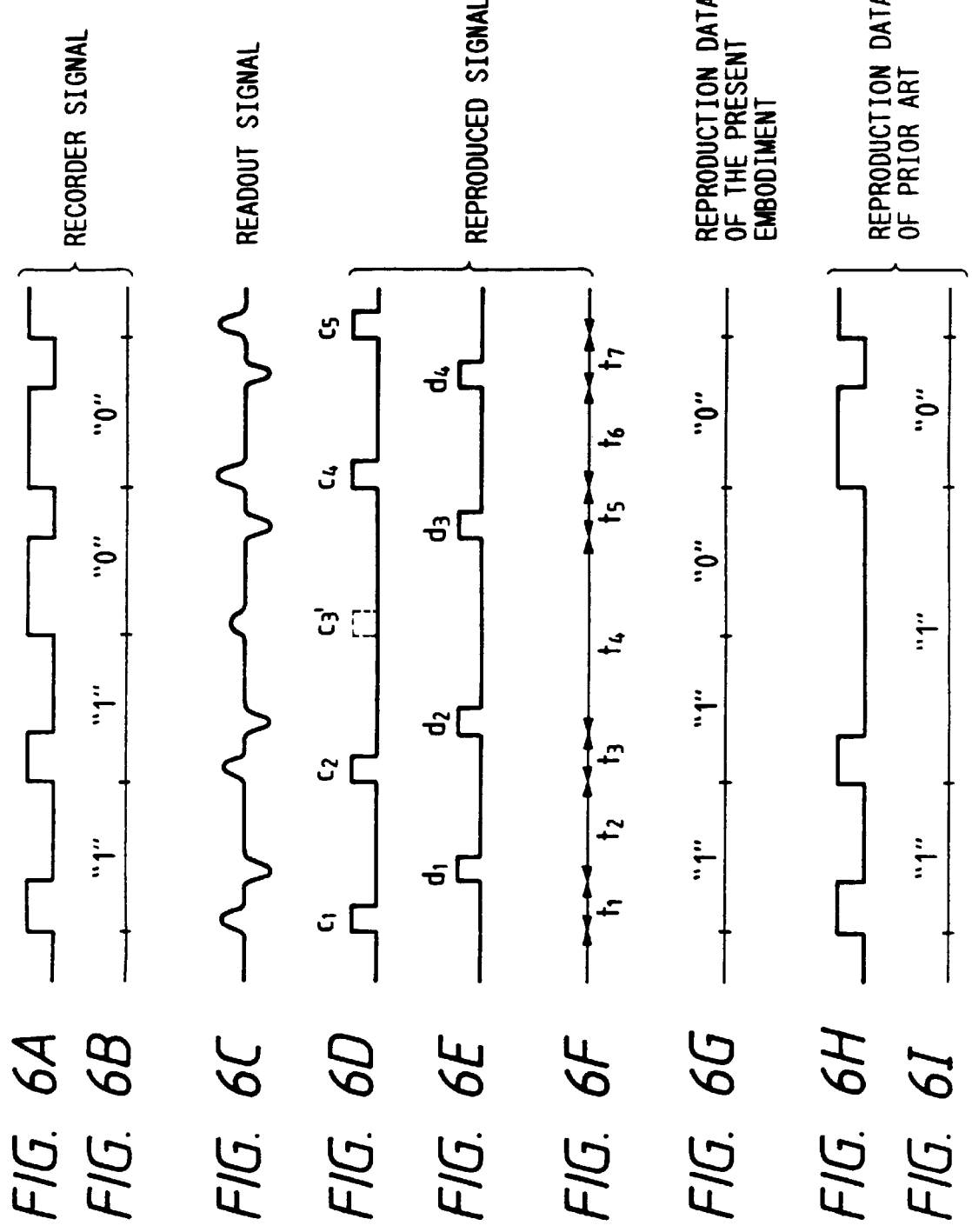
FIGS. 6A to 6I are timing charts for the data reproduction operations shown in FIG. 4 and FIG. 5.
Figure 7:
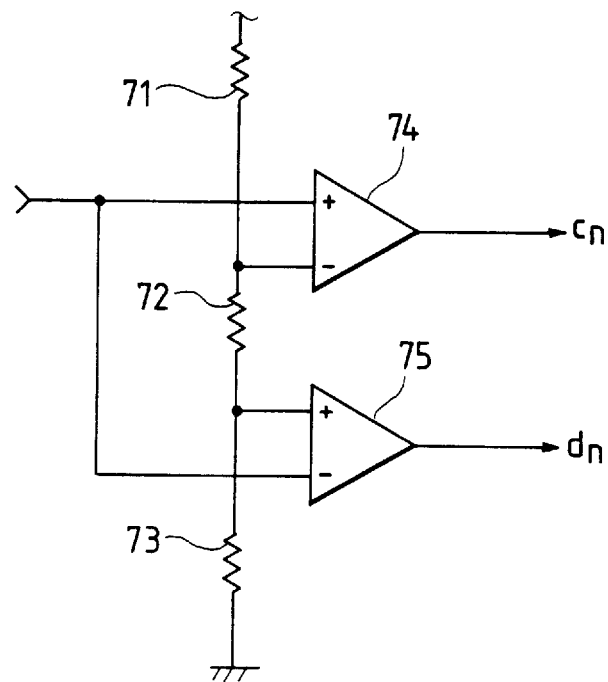
FIG. 7 is a circuit diagram showing the principal structure formed in the magnetic reproduction circuit shown in FIG. 2.

FIG. 7 is a view showing the circuit portion in the above-mentioned magnetic reproduction circuit 13 for detecting the signals shown in FIGS. 6D and 6E.

In FIG. 7, resisters at 71, 72, and 73 produce the reference voltages, respectively, and the comparators at 74 and 75 output the pulse trains $c_n$, and $d_n$, in FIGS. 6D and 6E, respectively.

Now, using the above-mentioned FIG. 6, the reproduction operation in the step 3 in FIG. 3 will be described in detail in accordance with the flowchart shown in FIG. 4.

In step 401, the first clock edge, that is, $c_1$ in FIG. 6D, is detected. By detecting this, the process will proceed to step 402. In the step 402, the timer 1 is started, and in the next step 403, whether the first data edge, that is, $d_1$ in FIG. 6E, has been detected or not is discriminated. By detecting this, the process will proceed to step 404 to stop the timer 1 described earlier. At this juncture, the aforesaid timer 1 is regarded as having counted the $t_1$ in FIG. 6F.

Then, in step 405, the timer 2 is started, and in step 406, whether the next clock edge is detected or not, that is, whether the $c_2$ in FIG. 6D is detected or not, is discriminated. By detecting this, the process will proceed to step 407. Also, if no clock edge is then detected as described later, the process will proceed to step 413. When the $c_2$ has been detected, the process will proceed to the step 407 to stop the above-mentioned timer 2. At this juncture, the aforesaid timer 2 is regarded as having counted the $t_2$ in FIG. 6F.

In step 408, the counted values of the above-mentioned timer 1 and timer 2 are compared. In other words, the values of the $t_1$ and $t_2$ are examined at this juncture, and here, the relation is found to be $t_1<t_2$. Thus, the process will proceed to step 409 in which the data read out then is set up as "1" (refer to FIG. 6G). Also, if the counted values of the timer 1 and timer 2 represent the relation $t_6>t_7$ as at $t_6$ and $t_7$ in FIG. 6F, that is, the value of the timer 1 is greater than the value of the timer 2, the process will proceed to step 415, in which the data read out then is set up as "0" (refer to FIG. 6G).

In step 410, the sum of the counted values of the timer 1 and timer 2, that is, the value, $t_1+t_2$, at this juncture, divided by 2 is stored. This value (defined as count 1) is used for the error routine (step 414) which will be described later.

Then, proceeding to step 411, the process causes the timer 1 to be started. Subsequently, in step 412, whether the information reproduction has been terminated or not is examined. If terminated, this routine is terminated, and the process will return to the step 4 in FIG. 3. If not terminated as yet, the process will return to the step 403 to read the next data. Here, the process has returned to the step 403.

In the step 403, whether the next data edge is detected or not, that is, whether the $d_2$ in FIG. 6E has been detected or not, is discriminated. By detecting this, the process will proceed to step 404 to stop the timer 1 which has been started in the step 411 as described earlier. At this juncture, the timer 1 is regarded as having counted the $t_3$ in FIG. 6F.

In step 405, the timer 2 is started in the same manner as described above, and in step 406, whether the next clock edge is detected or not, that is, whether the $c_3'$ indicated by the broken line in FIG. 6D has been detected or not, is discriminated. Here, however, the reproducing signal for the clock corresponding to the $c_3'$ is small as shown in FIG. 6C. Therefore, the $c_3'$ cannot be detected here, and the process will proceed to step 413.

Figure 5:
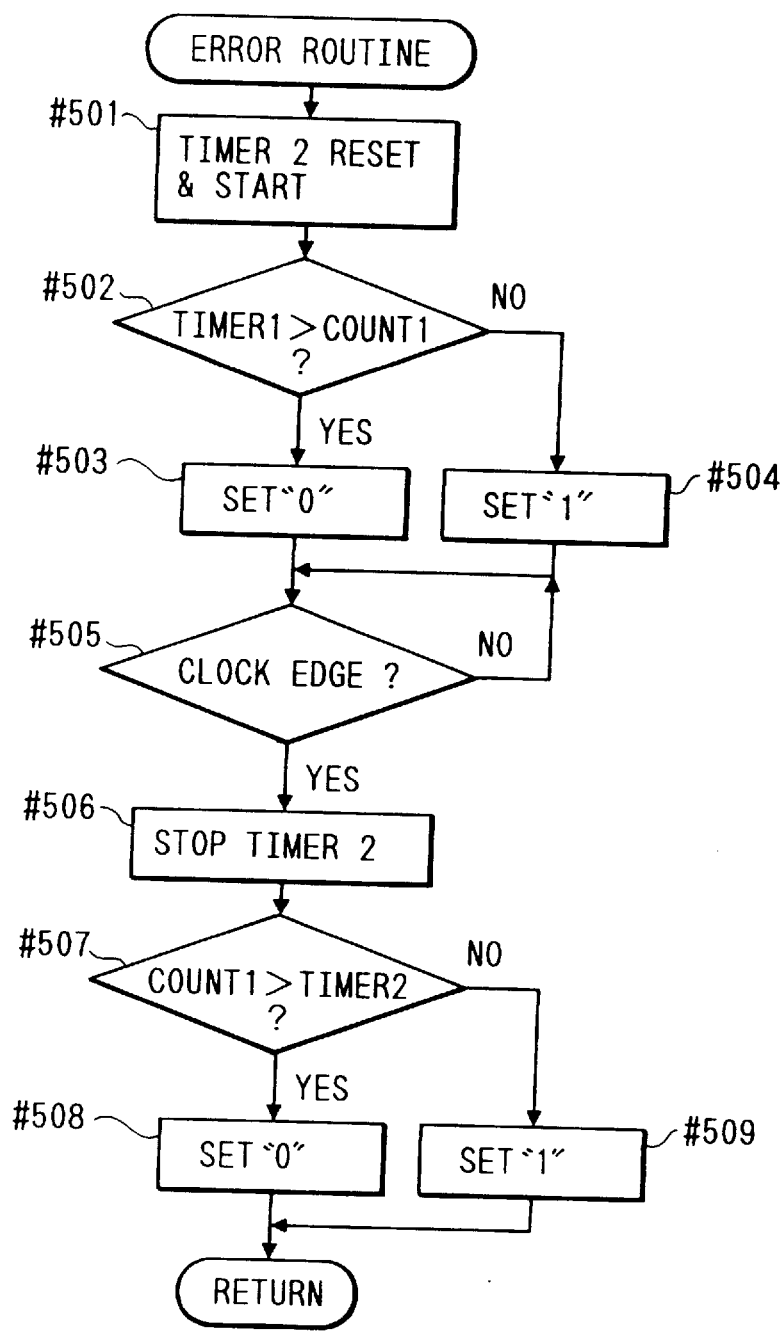
FIG. 5 is a flowchart showing the operation of an error routine in the step 414 in FIG. 4 in detail.

In step 413, whether the next data edge is detected or not, that is, whether the $d_3$ in FIG. 6E has been detected or not, is discriminated. If not detected, the process will proceed to step 406. Here, since the next data edge has been detected, the process proceeds to step 414. Thus, in this step 414, the error routine, which will be described in detail in conjunction with FIG. 5, is executed, and the process will proceed to step 411.

Now, using FIG. 5, the description will be made of the error routine to be executed in the above-mentioned step 414.

In step 501, the timer 2 is reset and is again started. In conjunction with FIG. 6F this means that the $t_4$ is reset and the counting of $t_5$ is started.

Then, because the $c_3'$ in FIG. 6D cannot be detected, the process will proceed to step 502 to determine whether the $d_2$ in FIG. 6E is "1" or "0" on the basis of the last time intervals $c_1$ and $c_2$. In other words, in the step 502, the stored $(t_1+t_2)/2$ in the step 410, that is, the counted values of the count 1 and timer 1, are compared, and if the result shows the relation, timer 1>count 1 $(=t_3>(t_1+t_2)/2)$, the process will proceed to step 503 to set up the data at this time as "0". Otherwise, the process will proceed to step 504 to set up the data at this time as "1". Here, the relation is not timer 1>count 1, the process proceeds to the step 504. Thus, it is regarded that the data "1" has been correctly determined as shown in FIG. 6G. In the prior art, the result is that the reproduction is erroneously output with one bit missing as shown in FIGS. 6H and 6I.

In the next step 505, the detection of the next clock edge, that is, the detection of the $c_4$ in FIG. 6D, is executed. By detecting this, the process will proceed to step 506 to stop the timer 2 which has been restarted in the above-mentioned step 501. In this case, the aforesaid timer 2 is regarded as having counted the $t_5$ in FIG. 6F.

In step 507, as in the above-mentioned step 502, the stored $(t_1+t_2)/2$ stored in the aforesaid step 410, that is, the values of count 1 and timer 2, are compared and if the result shows the relation the timer 2<count 1 $(=t_5>(t_1+t_2)/2)$, the process will proceed to step 508 to set up the data at this time as "0". Otherwise, the process will proceed to 509 to set up the data at this time as "1". Here, since the relation is the timer 2<count 1, the process proceeds to the step 508. Hence, it is regarded that the data "0" has been correctly determined as shown in FIG. 6G.

Figure 4:
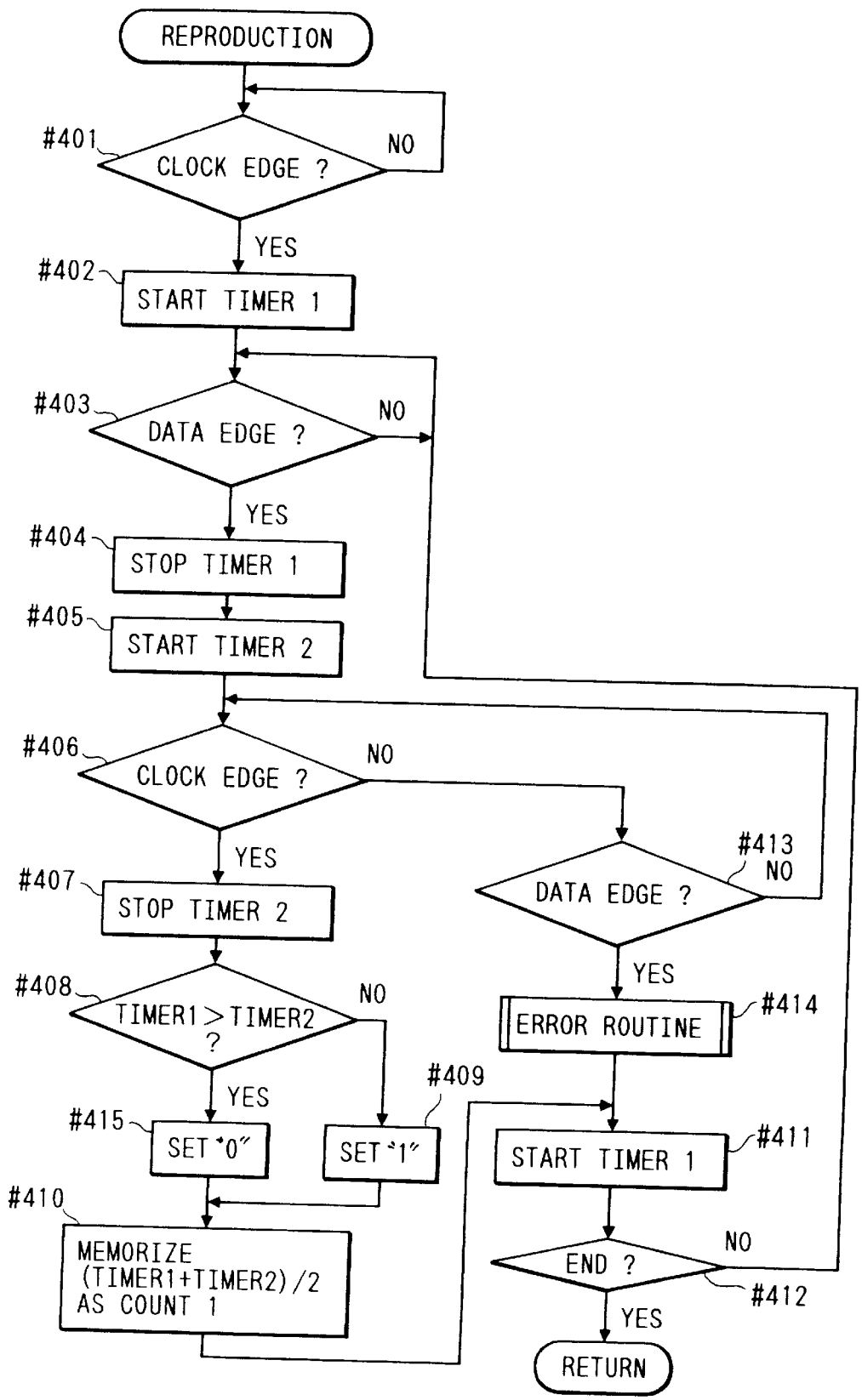
FIG. 4 is a flowchart showing the details of a reproduction operation according to a first embodiment.

When the above-mentioned operation is terminated, the process will return to the step 411 in FIG. 4 to execute the normal routines.

Figure 8:
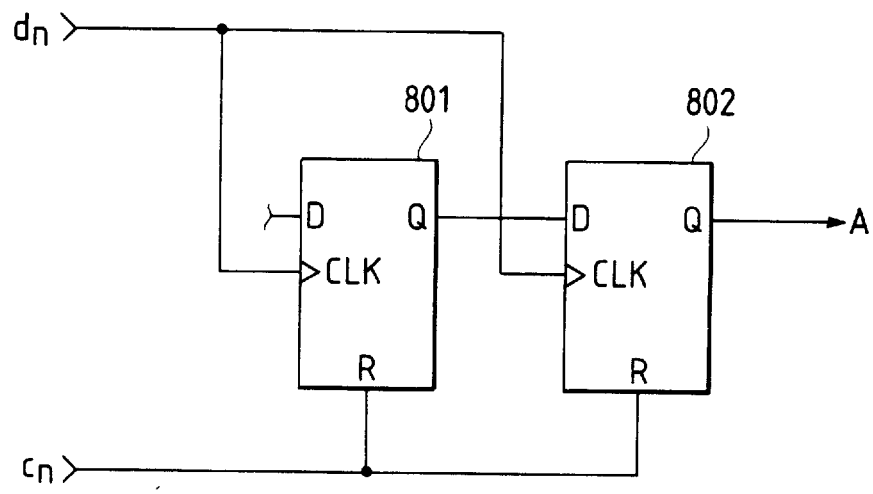
FIG. 8 is a circuit diagram showing an electrical process for an error discrimination.

FIG. 8 is a view showing an example of the circuit construction for electrically executing the error discrimination process for the clock edge detection.

Reference numeral 801 and 802 designate D flip-flops. The pulse train dn generated at the data edge in FIG. 6E is inputted into each of the clock terminals CLK while the pulse train cn generated at the clock edge in FIG. 6D is inputted into the reset terminal R. Then, the structure is arranged so that the output Q of the D flip-flop 801 is inputted into the D input terminal of the flip-flop 802. Also, the D input terminal of the D flip-flop 801 is maintained at a high level.

In the above-mentioned structure, when the pulses $d_2$ and $d_3$ generated at the data edge are detected twice in succession without the pulse $c_3'$ generated at the clock edge as shown in the aforesaid FIGS. 6D and 6E, "1" is output from the output terminal A so that the generation of a clock detection error can be notified by warning means or the like.

Also, this circuit can be adopted in place of the part of the operation where the steps are advanced from 406→413→414 in FIG. 4 according to the first embodiment. In this case, if any clock detection error is generated while an normal reproduction operation is being executed as shown in FIG. 4, the process will immediately proceed to the operation in the step 414.

According to the above-mentioned embodiment, in reproducing the magnetically recorded information by the self-clock method, means for detecting clock edge reading errors is provided. Hence, there is no possibility that the signal which contains any error is used as a correct reproduction signal in the circuits thereafter. Also, in such a case as this, the restoration process is given to the part having any erroneous reading as described in conjunction with FIG. 5, thus making it possible to output correct reproduction signals without any one of bits being omitted.

As described above, according to the present embodiment, there is provided in the magnetic reproducing means, discriminating means for discriminating a clock edge detection error by clock edge detecting means thereby to enable any presence of errors to be notified if the clock edge detection error takes place. As a result, if there is any errors in reading out a magnetic record, it is possible to prevent this from being output as a correctly reproduced signal.

Also, in the magnetic reproducing means, there are further provided storage means for storing the time interval between the clock edge and last clock edge, and data restoring means for setting up the data on the basis of the time interval thus stored in the aforesaid storage means if any error is discriminated by the discriminating means for the clock edge detection. In this way, if the clock edge detection error takes place, the same clock edge as the one obtained by the correctly executed clock edge detection error is produced on the basis of the time interval between the clock edge and last clock edge. Thus, in accordance with this clock edge, the data is set up. Therefore, even in a case where the magnetic record has been erroneously read, it is always possible to output a correctly reproduced signal.

Second Embodiment

FIGS. 11A to 11I are views showing the comparison of the second embodiment according to the present invention and prior art, in which the waveforms are illustrated at the respective processes from reading out signals by the magnetic head H to outputting the aforesaid signals as reproduced signals.

FIG. 11C represents the signal which the magnetic head H has read out from the recording track T of the film F. This signal is the signal as having been written as shown in FIG. 11A at the time of recording. For this recorded information, the positive side in FIG. 11C corresponds to the clock edge and the negative side thereof corresponds to the data edge as shown in FIG. 11B, and to which clock edges, each of the data edges is closer, front or rear, the registration of "1" or "0" is determined.

FIGS. 11D and 11E are views showing the state that in the magnetic reproduction circuit 13, the peaks of the positive side and negative side in FIG. 11C are detected. The broken line at $d_2'$ in FIG. 11E indicates that the peak in FIG. 11C is too small to be detected.

Also, FIG. 11F represents the counted value which is used for making the data definite as "1" or "0". FIG. 11G represents the reproduction output according to the present embodiment. FIGS. 11H and 11I represent the conventionally reproduced output when such signal as shown in FIG. 11C has been read.

Figure 11:
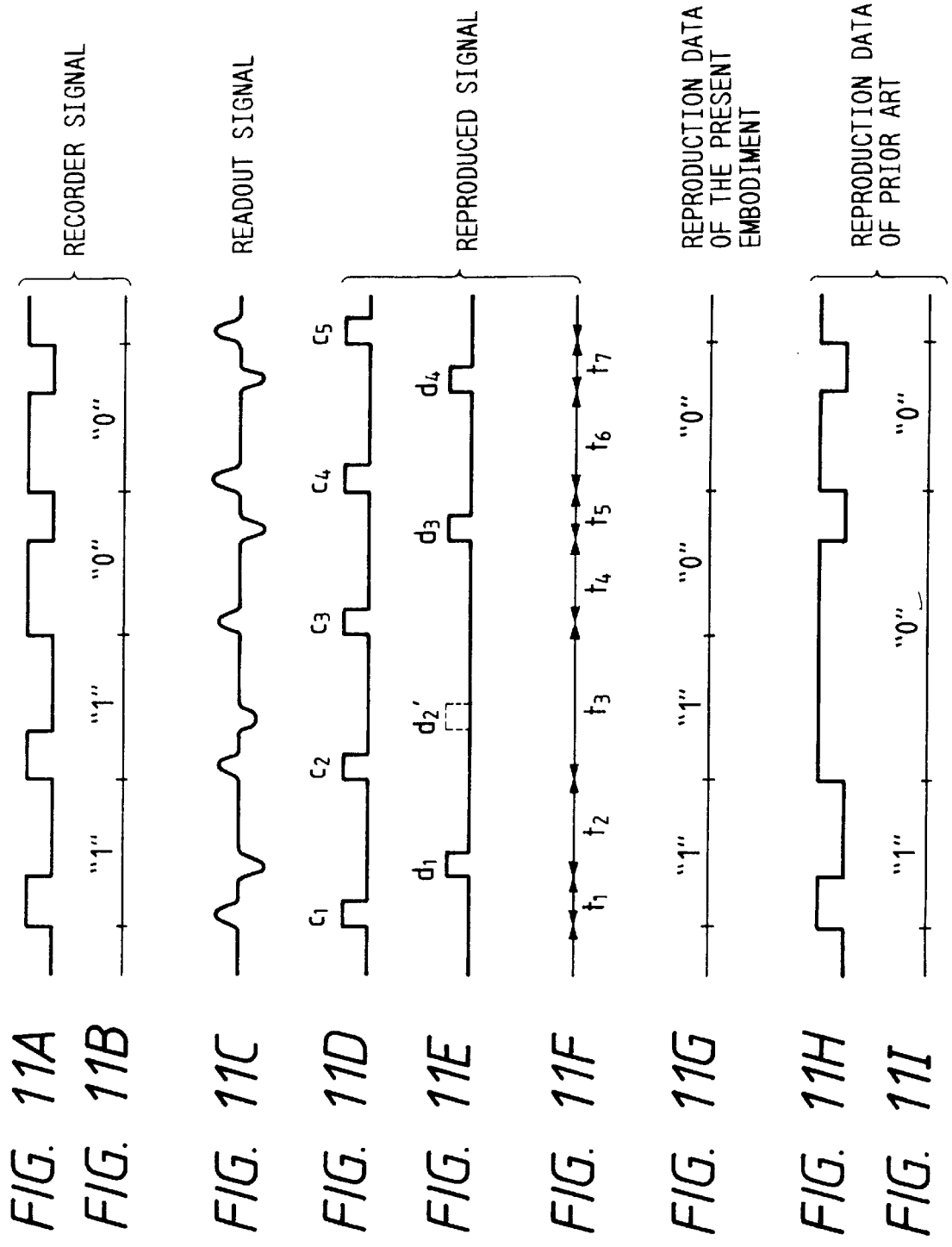
FIGS. 11A to 11I are timing charts for the data reproducing processes in FIG. 9 and FIG. 10.

Now, using the above-mentioned FIG. 11 the details of the reproduction operation in the step 3 in FIG. 3 will be described in accordance with a flowchart shown in FIG. 9.

In step 401, the initial clock edge, that is, the $c_1$ in FIG. 11D is detected. By detecting this, the process will proceed to step 402. In the step 402, the timer 1 is started and in the subsequent step 403, whether the initial data edge has been detected or not, that is, whether the $d_1$ in FIG. 11E can be detected or not, is discriminated. If no detection can be made, the process will proceed to step 412. Here, it is possible to execute such detection, the process will proceed to step 404 to stop the timer 1 described earlier. At this juncture, the aforesaid timer 1 is regarded as having counted the $t_1$ in FIG. 11F.

Now, in step 405, the timer 2 is started. In step 406, whether the next clock edge is detected or not, that is, whether the $c_2$ in FIG. 11D has been detected or not, is discriminated. By detecting this, the process will proceed to step 407. In the step 407, the above-mentioned timer 2 is stopped. At this juncture, the aforesaid timer 2 is regarded as having counted the $t_2$ in FIG. 11F.

In step 408, the counted values of the above-mentioned timer 1 and timer 2 are compared. In other words, the sizes, large or small, of the $t_1$ and $t_2$, are determined at this juncture. Here, these two timers are in the relation of $t_1<t_2$. Accordingly, the process will proceed to step 409 to set up "1" for the data thus read out (refer to FIG. 11G). Also, if the counted values of the timer 1 and timer 2 are in the relation of $t_6>t_7$ as in the case of the $t_6$ and $t_7$ in FIG. 11F, that is, the counted value of the timer 1 is greater than the counted value of the timer 2, the process will proceed to step 414 to set up "0" for the data thus read out (refer to FIG. 11G).

In step 410, the timer 1 is started. Then, in the next step 411, whether the information reproduction has been terminated or not is examined. If terminated, this routine is terminated. The process will return to the step 4 in FIG. 3. If not, the process here will return to the step 403. Here, the process returns to the step 403 again.

In the step 403, whether the next data edge is detected or not, that is, whether the $d_2'$ indicated by the broken line in FIG. 11E is detected or not, is examined. Here, however, the reproduction output signal of the data corresponding to the $d_2'$ is so small as shown in FIG. 11E that this $d_2'$ cannot be detected. The process here will proceed to step 412.

In the step 412, whether the next clock edge is detected or not, that is, whether the $c_3$ in FIG. 11D is detected or not, is examined. By detecting this, the process will proceed to step 413.

In the step 412, since no data edge can be detected, the process will proceed to step 413 after storing the data as having been detected with one bit information undefined. Here, the counting of the $t_4$ in FIG. 11F is started. In this respect, for the above-mentioned undefined recording, there must be a state of being undefined besides "0" and "1". This setting can be provided by assigning two bits to one data, for example. The assignment is given as an example "0"→"00", "1"→"11", and "UNDEF"→"01".

In the prior art, no data edge has been detected here. Therefore, the magnetic reproduction information is output erroneously with one bit short as shown in FIG. 11H. However, in the present embodiment any missing bit is detected as described above and the "UNDEF" information is stored, thus making it possible to reproduce data without any errors in such a manner as set forth below in conjunction with FIG. 10.

Figure 10:
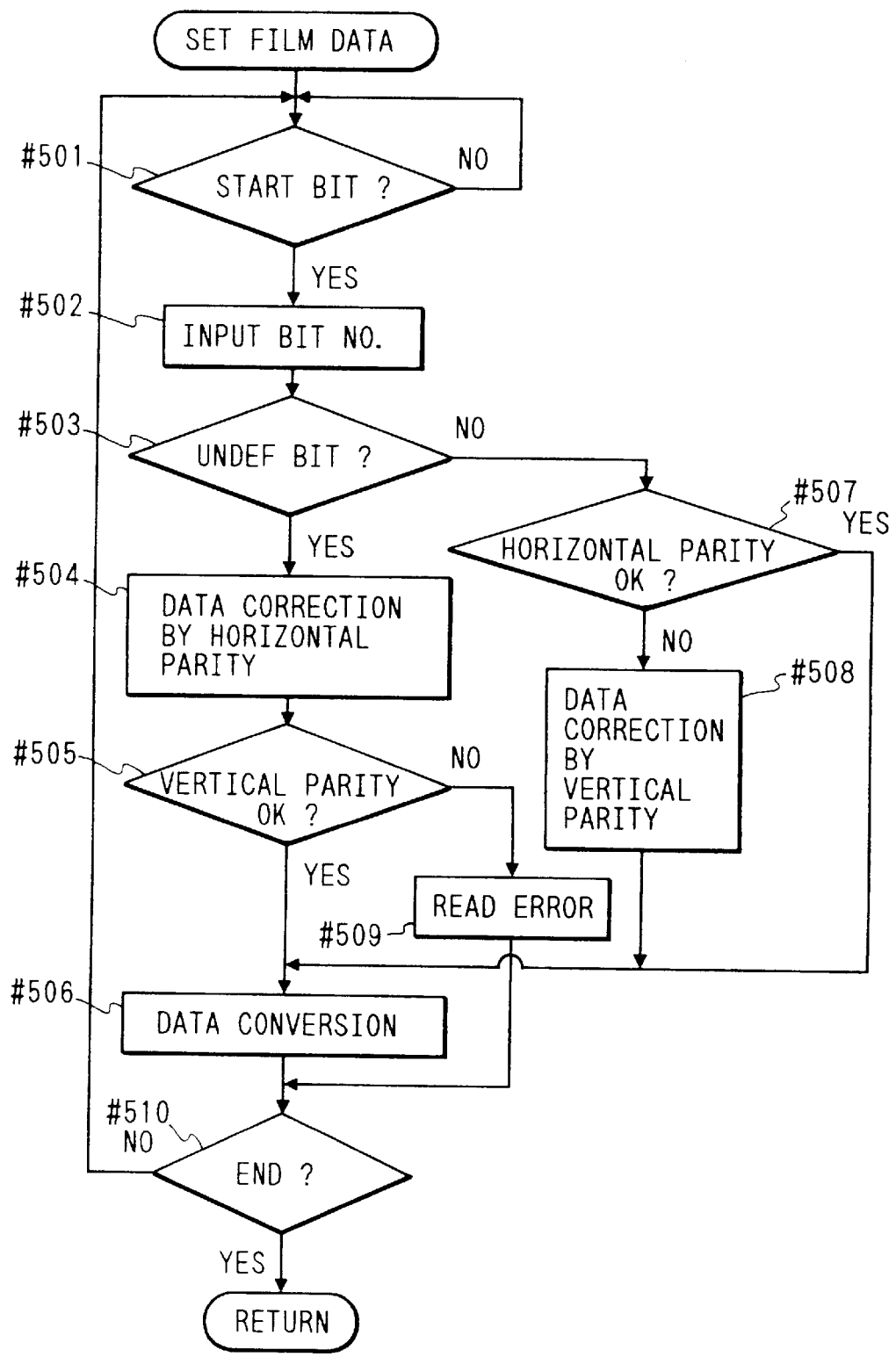
FIG. 10 is a flowchart showing data restoring processes according to the second embodiment of the present invention.

FIG. 10 is a flowchart showing the operation at the time of film information set up in the step 4 in FIG. 3. Now, in accordance with this flowchart, the operation will be described in detail.

In step 501, the bit information array read out in the step 3 is searched to find the information starting signal, and the process will proceed to step 502. In the step 502, the bit number which constitutes a series of data is inputted. Here, the bit numbers can be those continuing until its end signal or they can be discriminated by a regulation number.

Figure 9:
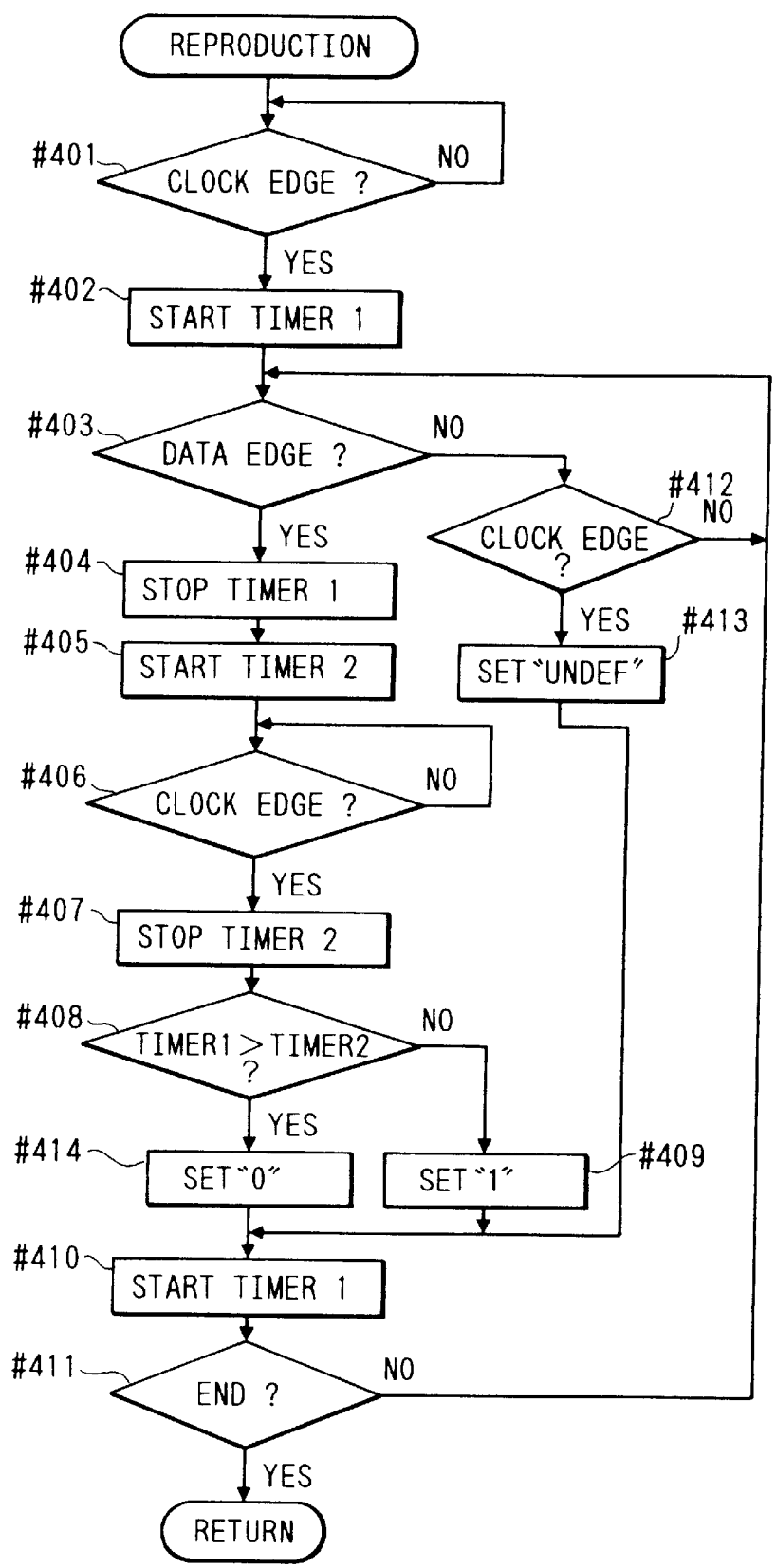
FIG. 9 is a flowchart showing data reproducing processes according to a second embodiment of the present invention.

In step 503, whether may undefined information resulting from the data edge detection error, which has been stored in the step 413 in FIG. 9, is included or not is discriminated. If there is no undefined bit included, the process will proceed to step 507; if any undefined bit is present, to step 504.

In step 507, a horizontal parity check is conducted. The horizontal parity means an even or odd number parity bit given to the eighth bit while data consist of seven bits. As a result, with the horizontal parity being satisfied, the process will proceed to step 506. If not satisfied, there is an error in such an eight-bit data. Then, the process will proceed to step 508 to conduct the data compensation by a vertical parity. The vertical parity means an eight-bit data comprising the parity in the vertical direction which is added to the last data by arranging the array of 7+1 bit data vertically. In this way, it is possible to compensate a bit where the horizontal parity error and the vertical parity error intersect as a bit which has resulted in the reproduction failure. In this respect, the above-mentioned step 507 and step 508 are the operations among those processes generally conducted.

In the above-mentioned step 503, if any undefined bit is discriminated, the process will proceed to step 504 as described earlier to ascertain whether such an undefined portion is "0" or "1" according to the horizontal parity. In this respect, if a parity bit is undefined, it may be ascertained by the seven-bit data.

In step 505, whether the compensated data in the step 504 has also satisfied the vertical parity or not is examined. If it is satisfied, the process will proceed to step 506; if not, to step 509 to execute either a series of data processings given below as a consequence of a reproduction error or to read out the same series of the data again and then to step 510. Here, this is because the reproduction error in the step 509 is only the vertical parity error and it is impossible to specify the error bit.

In step 506, using a data table, the reproduced data are converted into film speeds, numbers, and other information specifically. Then, the process will proceed to step 510.

In the step 510, this routine is terminated if the required information has been obtained, and the process will return to the step 5 in FIG. 3; otherwise, to the step 501.

Also, in the error discrimination circuit shown in FIG. 8, if the pulses $c_2$ and $c_3$ generated at the clock edge are detected twice in succession without the input of the pulse $d_2$' generated at the data edge as shown in FIGS. 11D and 11E described earlier, "1" is output from the output terminal A to notify that a data detection error has been generated. Then, this is stored as an "UNDEF" information.

According to the second embodiment set forth above, when information magnetically recorded by the self-clock method is reproduced, there is no possibility that any erroneous signal can be used as a correctly reproduced signal in any of the subsequent circuits. Also, in such a case as this, the restoration processing is given to the portion having read out error as described in conjunction with FIG. 10. In other words, an "UNDEF" information is stored for the portion where the data edge reading out error is present and then this is restored by the parity bit. Therefore, it is possible to output correctly reproduced signals without any bit being omitted. Hence, an apparatus can be implemented with an enhanced reliability of reading out the entire information.

As described above, according to the present embodiment, the data are set up in accordance with the detected clock edge and data edge as well as the time interval between the aforesaid data edge and the next clock edge, and in the magnetic reproducing means which outputs the data as reproduced signals, there are provided discriminating means for discriminating the detection error for the data edge by data edge detecting means, and information setting up means for setting up information as being undefined if any detection error for the data edge is discriminated by the aforesaid discriminating means, and if the data edge detection error is discriminated due to the fact that the next clock edge is again detected instead of the anticipated data edge subsequent to the detected clock edge, the information is set up as being undefined, hence restoring the data by the parity check which will be conducted later. As a result, even if there is an error in reading out the recorded information, it is possible to output a correctly reproduced signal corresponding to the recorded information.

Third Embodiment

FIG. 14 is a view showing the comparison between the third embodiment and prior art with respect to the recording signals, in which the waveforms in the respective processes from reading out signals by the magnetic head H to outputting the aforesaid signals as reproduced signals.

FIG. 14C represents the signal which the magnetic head H has read out from the recording track T of the film F. This signal is the signal as having been written as shown in FIG. 14A at the time of recording. For this recorded information, the positive side in FIG. 14C corresponds to the clock edge and the negative side thereof corresponds to the data edge as shown in FIG. 14B, and to which clock edges each of the data edges is closer, front or rear, the registration of "1" or "0" is determined.

FIGS. 14D and 14E are views showing the state that in the magnetic reproduction circuit 13, the peaks of the positive side and negative side in FIG. 14C are detected. The broken lines at $c_3$' in FIG. 14D and $d_2$' in FIG. 14C indicate that the peak in FIG. 14C is too small to be detected.

Also, FIG. 14F represents the counted value which is used for making the data defined as "1" or "0". FIG. 14G represents the reproduction output according to the present embodiment. FIGS. 14H and 14I represent the conventionally reproduced output when such signal as shown in FIG. 14C has been read.

Now, using the above-mentioned FIG. 14 the details of the reproduction operation in the step 3 in FIG. 3 will be described in accordance with a flowchart shown in FIG. 12.

In step 401, the initial clock edge, that is, the $c_1$ in FIG. 14D is detected. By detecting this, the process will proceed to step 402. In the step 402, the timer 1 is started and in the subsequent step 403, whether the initial data edge has been detected or not, that is, whether the $d_1$ in FIG. 14E can be detected or not, is discriminated. By detecting this, the process will proceed to step 404 to stop the timer 1 described earlier. At this juncture, the aforesaid timer 1 is regarded as having counted the $t_1$ in FIG. 14F.

Now, in step 405, the timer 2 is started. In step 406, whether the next clock edge is detected or not, that is, whether the $c_2$ in FIG. 14D has been detected or not, is discriminated. By detecting this, the process will proceed to step 407. In the step 407, the above-mentioned timer 2 is stopped. At this juncture, the aforesaid timer 2 is regarded as having counted the $t_2$ in FIG. 14F.

In step 408, the counted values of the above-mentioned timer 1 and timer 2 are added to obtain the value $(t_1+t_2)$ between the $c_1$ and $c_2$ in FIG. 14D. Then, this value and the time interval between the last clock edge and the clock edge, that is, the value obtainable by the last $(t_1+t_2)$ times 1.5, are compared to define which is greater. If the current value is within the value 1.5 times the last value, the process will proceed to step 409; if it exceeds 1.5 times, to step 415. In this respect, the time interval between the above-mentioned last clock edge and the clock edge is stored as count 1 in the step 412 which will be described later. Also, at the initial point after a camera is actuated, the count 1 does not exist. However, if the count 1 is set for its maximum value so that this step can be passed unconditionally, the normal processing will result with the time interval between the next clock edge and the clock edge.

As described above, when the current value is within 1.5 times the last value, the process will proceed to step 409. Here, the sizes of the counted values of the above-mentioned timer 1 and timer 2 are compared, and if the $t_1$ is greater, the process will proceed to step 410; if the $t_1$ is smaller, to step 411. In the case of FIG. 14, these two timers are in the relation of $t_1<t_2$. Accordingly, the process will proceed to step 411 to set up "1" for the data thus read out (refer to FIG. 14G). Also, if the counted values of the timer 1 and timer 2 are in the relation of $t_5>t_6$ as in the case of the $t_5$ and $t_6$ in FIG. 14F, that is, the counted value of the timer 1 is greater than the counted value of the timer 2, the process will proceed to step 410 to set up "0" for the data thus read out (refer to FIG. 6G).

In step 412, the value $t_1+t_2$, which is the sum of the counted values of the above-mentioned timer 1 and timer 2, is stored as count 1 as described earlier. Then, the process will proceed to step 413 to start the timer 1. In the next step 414, whether the information reproduction has been terminated or not is examined. If terminated, this routine is terminated. The process will return to the step 4 in FIG. 3. If not, the process here will return to the step 403. Here, the process returns to the step 403 again.

In the step 403, whether the next data edge is detected or not, that is, whether the $d_2'$ indicated by the broken line in FIG. 14E is detected or not, is examined. Here, however, the reproduction output signal of the data corresponding to the $d_2'$ is so small to be detected as shown in FIG. 14C. This step is repeated, and further, when the next data edge, that is, the $d_3$ indicated by the broken line in FIG. 14E, is detected, the step will at last proceed to step 404. At this juncture, therefore, it can be regarded that the two bits, $d_2'$ in FIG. 14E and $c_3'$ in FIG. 14D, which are related to the two edges, have not been detected.

In the next step 404, the timer 1 which has been started in the step 413 as described earlier is stopped. At this juncture, the $t_3$ in FIG. 14F is regarded as having been counted in the aforesaid timer 1.

In step 405, the timer 2 is started likewise as has been described earlier, and in step 406, whether the next clock edge is detected or not, that is, whether the $c_4$ in FIG. 14D is detected or not, is examined. By detecting this $c_4$, the process will proceed to step 407 to stop the timer 2. At this juncture, the $t_4$ in FIG. 14F is regarded as having been counted in the aforesaid timer 2.

In step 408, the counted values of the above-mentioned timer 1 and timer 2 are added likewise as has been described earlier. In this case, however, it is conceivable that the value $t_3+t_4$ has been obtained between the $c_2$ and $c_4$ in FIG. 14D. The this value and the value obtainable by 1.5 times the last $t_1+t_2$, that is, the value 1.5 times the count 1 stored in the step 412, are compared to discriminate their sizes. As a result, it is clear from FIG. 14F that the $t_3+t_4$ is approximately two times the $t_1+t_2$. The process will then proceed to step 415.

In the step 415, no two-bit information can be detected. Therefore, the process will proceed to step 413 after having stored a two-bit information as "UNDEF".

Here, the case where a set is missed in a sequence of data edge—clock edge is exemplified. The sequence of the process will proceed to step 415 when a set is missed alike in a sequence of clock edge—data edge, where the "UNDEF" processing will be executed. In this respect, three values of information, "0", "1", and "UNDEF", are recorded here. As a method of recording these three, it is possible to assign two bits to each of them. The assignment is given as "0"→"00", "1"→"11", and "UNDEF"→"01", for example.

In the prior art, no data edge nor clock edge can be detected, respectively, here. Therefore, the magnetic reproduction information is output erroneously with one bit short as shown in FIG. 14H. However, in the present embodiment, any missing bit is detected as described above and the "UNDEF" information is stored, thus making it possible to reproduce data without any errors in such a manner as set forth below in conjunction with FIG. 13.

Figure 13:
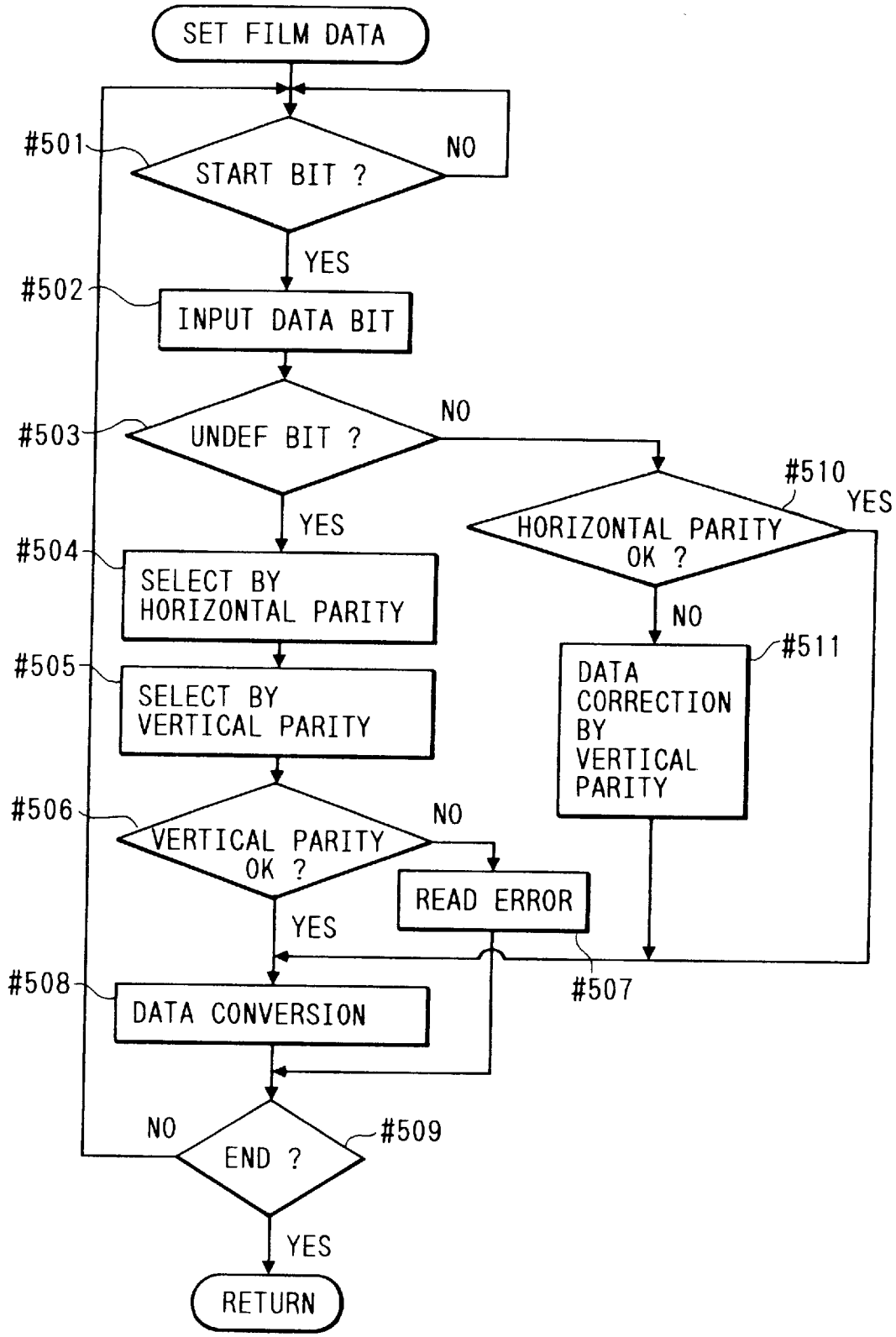
FIG. 13 is a flowchart showing data restoring processes according to the third embodiment of the present invention.

FIG. 13 is a flowchart showing the operation at the time of film information set up in the step 4 in FIG. 3. Now, in accordance with this flowchart, the operation will be described in detail.

In step 501, the bit information array read out in the step 3 is searched to find the information starting signal, and the process will proceed to step 502. In the step 502, the bit number which constitutes a series of data is inputted. Here, the bit numbers can be those continuing until its end signal or they can be discriminated by a regulation number.

In step 503, whether any undefined information, which has been stored in the step 415 in FIG. 4, is included or not is discriminated. If there is no undefined bit included, the process will proceed to step 510; if any undefined bit is present, to step 504.

In step 510, a horizontal parity check is conducted. The horizontal parity means an even or odd number parity bit given to the eighth bit while data consist of seven bits, for example. As a result, with the horizontal parity being satisfied, the process will proceed to step 508. If not satisfied, there is an error in such an eight-bit data. Then, the process will proceed to step 511 to conduct the data compensation by a vertical parity. The vertical parity means an eight-bit data comprising the parity in the vertical direction which is added to the last data by arranging the array of 7+1 bit data vertically. In this way, it is possible to compensate a bit where the horizontal parity error and the vertical parity error intersect as a bit which has resulted in the reproduction failure. In this respect, the above-mentioned step 510 and step 511 are the operations among those processes generally conducted.

In the above-mentioned step 503, if any undefined bit is discriminated, the process will proceed to step 504 as described earlier to ascertain whether such an undefined portion is a combination of {"01" or "10"} or {"00" or "111"} according to the horizontal parity. In this respect, if two bits including parity bit are undefined, it may be possible to obtain the combination from the remaining six-bit data.

In step 505, the combination of the two bits which satisfies the vertical parity is selected, and then the process will proceed to step 506. Here, whether the selected data satisfy the vertical parity or not is examined, and if satisfied, the process will proceed to step 508; if not, to step 507 to process the next series of data as a reproduction error or to read out the same series of data again, and proceed to step 509. In this respect, the reproduction error in the step 509 is caused by the inability of specifying the error bit combination.

In step 508, using a data table, the reproduced data are converted, into film speeds numbers, and other information specifically. Then, the process will proceed to step 509.

In the step 509, this routine is terminated if the required information has been obtained, and the process will return to the step 5 in FIG. 3; otherwise, to the step 501.

Figure 15:
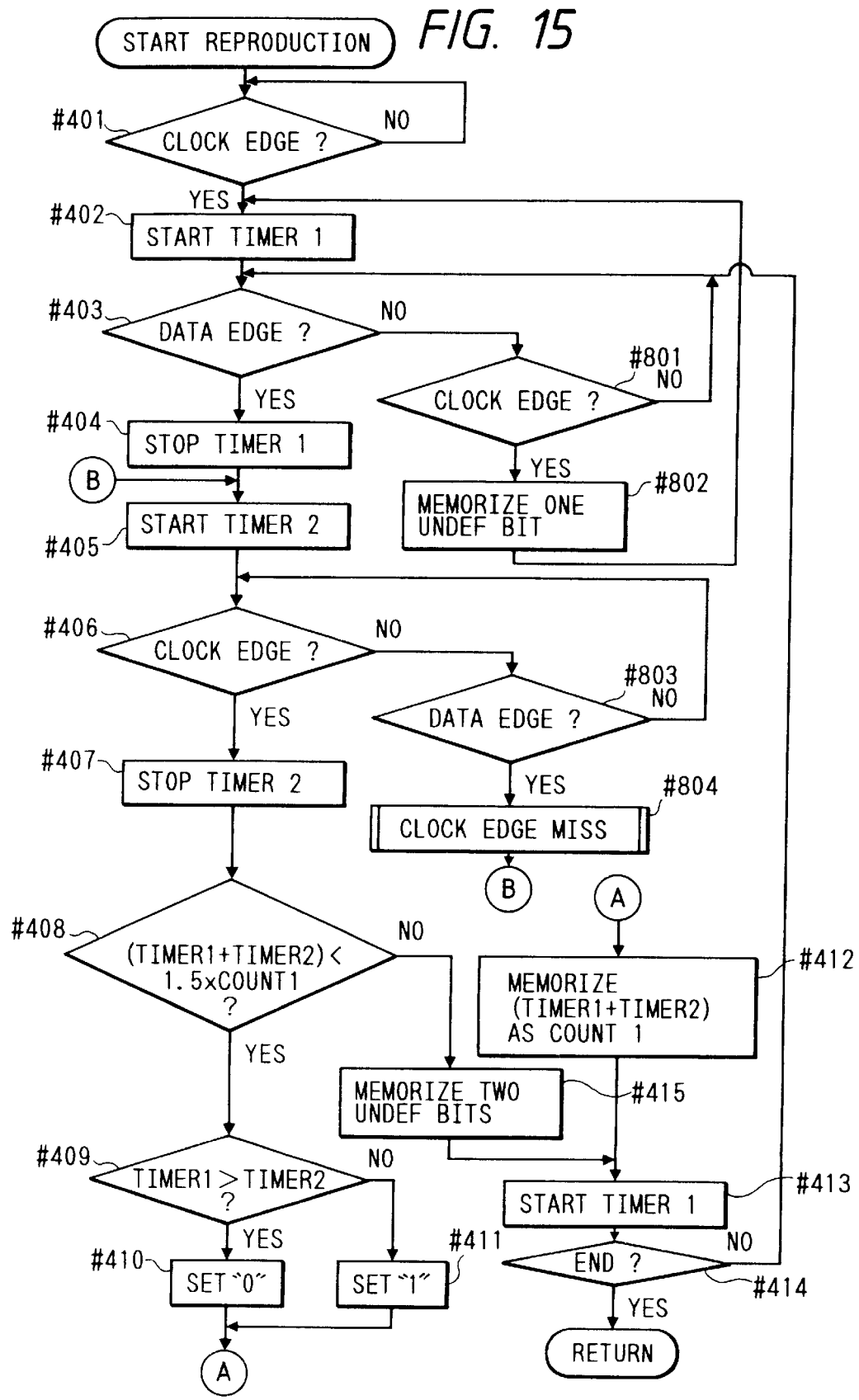
FIG. 15 is view showing a variation of the third embodiment according to the present invention.
Figure 16:
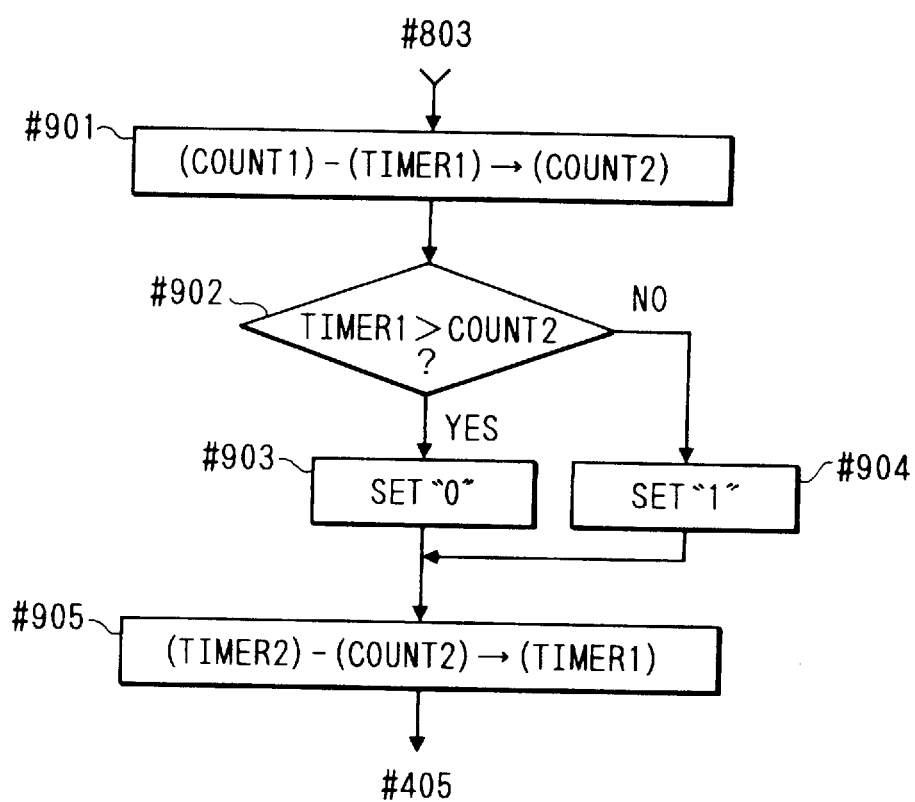
FIG. 16 is a flowchart showing the details of the process in the step 804 in FIG. 15.

FIG. 15 and FIG. 16 are views showing a variation of the third embodiment according to the present invention.

Figure 12:
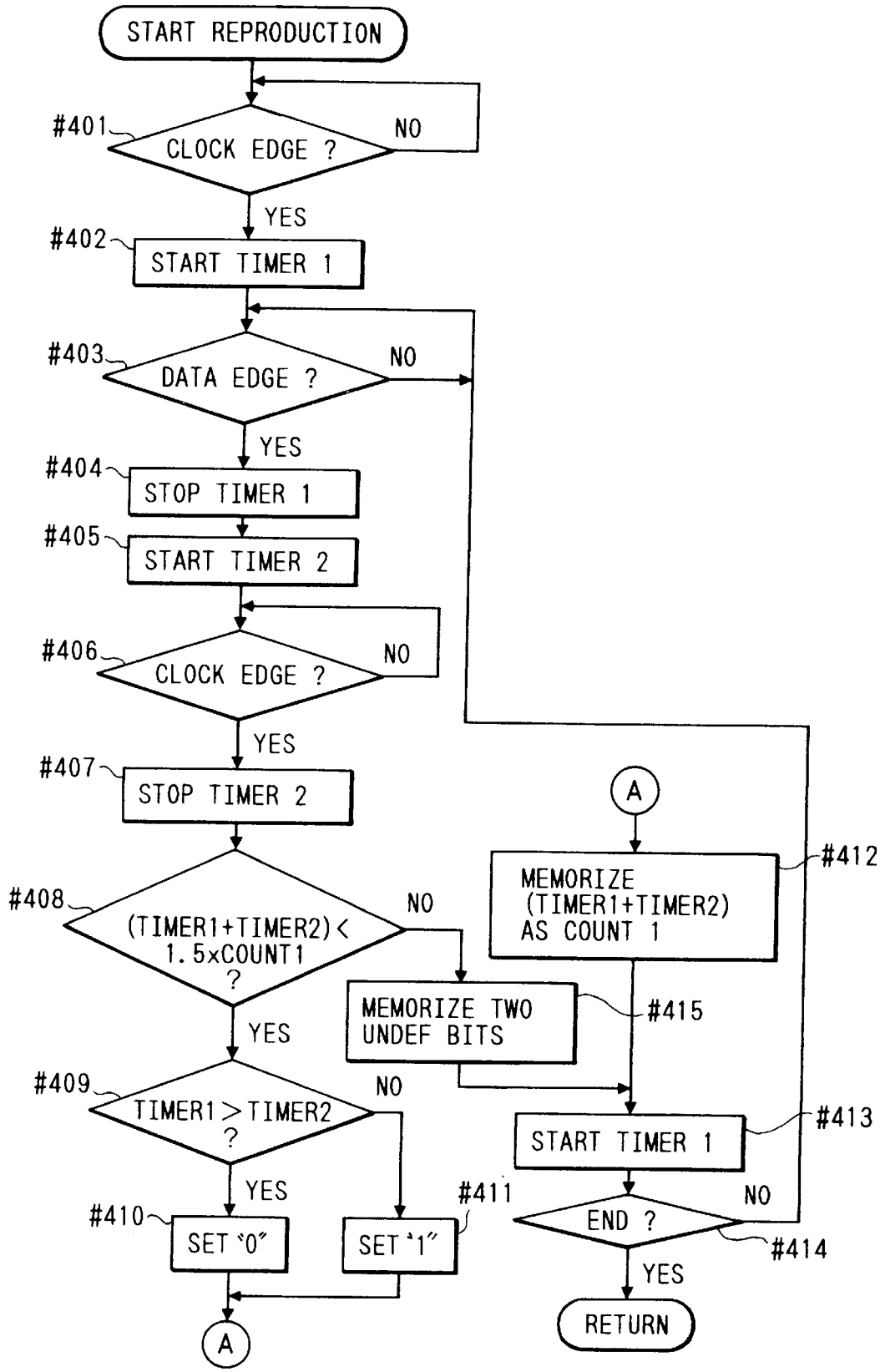
FIG. 12 is a flowchart showing data reproducing processes according to a third embodiment of the present invention.

In a flowchart shown in FIG. 12, even when only the clock edge or the data edge is missing, the process is executed as if all the clock edge and data edges are missing. In this example of the variation, an arrangement is made so that whereas the processes are executed in steps 803 and 804 when one clock edge is missing, the processes are executed in steps 801 and 802 when one data edge is missing.

Hereinafter, the description will be made of only the portion which differs from the third embodiment.

In FIG. 15, if the data edge cannot be detected in step 403, the process will proceed to step 801 to discriminate whether the clock edge has been detected or not. As a result, if no detection can be made, the process will return to the step 403. Also, if the detection can be made, the process will proceed to step 802 as having committed a data edge detection error and record one bit as "UNDEF". This "UNDEF" data can be restored using the horizontal parity as in the case described in conjunction with FIG. 5. When the "UNDEF" data has been recorded, the process will return to the step 402 to repeat the same operation.

Also, if no clock edge can be detected in the step 406, the process will proceed to step 803 to discriminate whether the data edge has been detected or not. As a result, if no detection can be made, the process will return to the step 406; if the detection can be made, it indicates that one clock edge is missing. Accordingly, in step 804, the "clock edge missing" treatment is given, and return to the step 405.

All the other operations are the same as the first embodiment.

Now, in conjunction with a flowchart shown in FIG. 16, the "clock edge missing" treatment in the step 804 will be described.

Since there has been a clock edge detection error, a value equivalent to the timer 2 is obtained in step 901 by an operation, (count 1)–(timer 1), using the count 1 which is the time interval between the last clock edge and clock edge, and this is stored as a count 2. Then, the process will proceed to step 902 to compare the timer 1 and the above-mentioned timer 2 for the discrimination of their sizes as in the step 409 in FIG. 8. Depending on its result, the process will proceed either to step 903 or step 904 to set up "0" or "1" for the data read out in those steps, respectively. After that, in step 905 an operation, (timer 2)–(count 2), is given for the use of detecting the later half of the data. This result is assigned to the timer 1, and the process will proceed to the step 405 in FIG. 8. Here, the above-mentioned timer 2 is the sum of the time interval between the data edge and clock edge for the last data, and the time interval between the clock edge and data edge for the data one after the next. Therefore, by subtracting the count 2 therefrom, the next timer 1 can be obtained.

Figure 17:
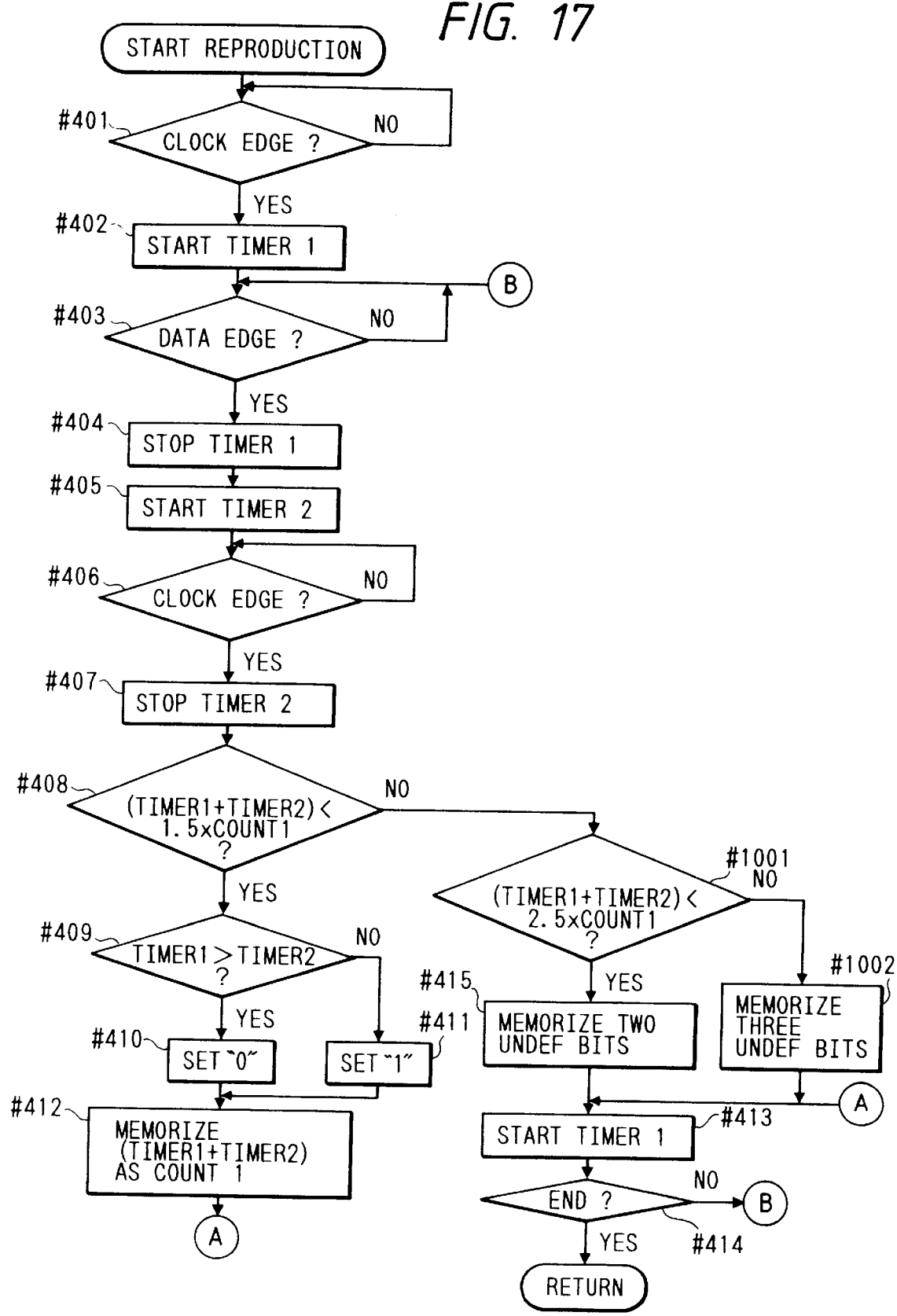
FIG. 17 is view showing a second variation of the third embodiment according to the present invention.

FIG. 17 is a view showing a second variation of the third embodiment according to the present invention, which is an improvement in the flowchart shown in FIG. 12. In other words, this is a countermeasure to cope with such a situation in which subsequent to a data edge and clock edge, the following data edge is also erroneously detected.

In step 408, a size discrimination, (timer 1+timer 2)<(1.5×count 1), is exercised. As a result, if (timer 1+timer 2) is greater, the process will proceed to step 1001.

In the step 1001, a size discrimination, (timer 1+timer 2)<(1.5×count 1), is exercised. If (timer 1+timer 2) is smaller, the process will proceed to step 415 to store two bits for an "UNDEF" as described earlier. Also, if (timer 1+timer 2) is greater, the process will proceed to step 1002 to store three bits for an "UNDEF".

Here, it may be conceivable that a further treatment of more than three bits should be given, but in consideration of the fluctuations of film feeding speed, there is a possibility that accuracy is reduced. Also, if undefined bit numbers are great, possible numbers of data combination become too great, thus making it difficult to specify information by the algorithm represented in the flowchart in FIG. 10. Therefore, the three bits are considered as its maximum. If any detection error takes place requiring more than this, it will be made a reproduction error according to an arrangement prepared in FIG. 10.

According to the third embodiment set forth above, there are provided at the time of reproducing the information which is magnetically recorded by a self-clocking method, means for counting the time interval between the clock edge and the next clock edge, and means for comparing the stored last counted value and the current counted value, and with these means, an information of plural bits to indicate "UNDEF" is recorded when any detection error is discriminated. As a result, even when there are any continuous detection errors such as clock edge—data edge or data edge—clock edge, no bit will be missing. In other words, even if the bit value is unknown, it is possible to restore the bit value by the application of parity so that the accurate reproduction signals can be output correspondingly to the recorded information.

As described above, according to the present invention, there are provided in magnetic reproducing means, counting means for counting the time interval between the clocks, storage means for storing the time interval between the clocks for the last bit, discriminating means for comparing a value of given times the counted value stored in the aforesaid storage means and the currently counted value obtained by the aforesaid counting means so as to discriminate that there is some bit missing if the current value is found to be greater, and information setting up means for setting up an information indicating that it is undefined when any bit missing is found by the aforesaid discriminating means, and when any bit missing is discriminated by the fact that the counted value for the current clock interval is greater than the counted value for the last clock interval, an undefined information is recorded, thus enabling the data restoration by parity checks which will be performed later. Therefore, even if there is any error of plural bits in reading out a recorded information, it is possible to output the reproduction signals with fidelity to the recorded information.

What is claimed is:

1. An information reproduction apparatus for reproducing information recorded on a recording medium which is provided on a silver chloride film, comprising:

(a) a reading out portion for reading out pulse information which is recorded by a self-clocking method on a recording medium;

(b) detecting means for detecting edges changing in a first direction and edges changing in a second direction in accordance with the pulse information read out by said reading out portion;

(c) a reproduction circuit for specifying data on the basis of a first time interval between the edge changing in the first direction and the edge changing in the second direction and a second time interval between the edge changing in the second direction and the next edge changing in the first direction; and (d) a decision circuit for making a decision on error on the basis of the current time interval between succeeding edges changing in the first direction and a previous time interval between succeeding edges changing in the first direction.

2. An information reproduction apparatus according to claim 1, wherein said decision circuit makes a decision on error responsive to the current time interval between succeeding edges changing in the first direction being longer by a predetermined time period than the preceding time interval between succeeding edges changing in the first direction.

3. An information reproduction apparatus according to claim 1, wherein said decision circuit decides an error responsive to the current time interval being equal to or longer than 1.5 times the preceding time interval.

4. An information reproduction apparatus for reproducing information recorded on a recording medium which is provided on a silver chloride film, comprising:

(a) a reading out portion for reading out pulse information which is recorded by a self-clocking method on a recording medium;

(b) detecting means for detecting edges changing in a first direction and edges changing in a second direction in accordance with the pulse information read out by said reading out portion;

(c) a reproduction circuit for specifying data on the basis of a first time interval between the edge changing in the first direction and the edge changing in the second direction and a second time interval between the edge changing in the second direction and the next edge changing in the first direction; and (d) a decision circuit for making a decision on error on the basis of the current time interval between succeeding edges changing in the first direction and a previous time interval between succeeding edges changing in the first direction, said circuit deciding that a plurality of bit errors have occurred.

5. An information reproduction apparatus according to claim 4, wherein said decision circuit makes a decision on error responsive to the current time interval between succeeding edges changing in the first direction being longer by a predetermined time period than the preceding time interval between succeeding edges changing in the first direction.

6. An information reproduction apparatus according to claim 4, wherein said decision circuit decides an error responsive to the current time interval being equal to or longer than 1.5 times the preceding time interval.

* * * * *

UNITED STATES PATENT AND TRADEMARK OFFICE
CERTIFICATE OF CORRECTION

PATENT NO. : 5,774,284
DATED : June 30, 1998
INVENTOR(S) : AKIRA EGAWA

It is certified that error appears in the above-identified patent and that said Letters Patent is hereby corrected as shown below:

COLUMN 2

Line 19, "discrimination" should read --discrimination,--.

COLUMN 5

Line 19, "near," should read --rear,--.

COLUMN 7

Line 26, "an" should read --a--.

COLUMN 9

Line 67, Close up right margin.

COLUMN 10

Line 1, Close up left margin.
Line 44, after "signals", insert --are shown--.

UNITED STATES PATENT AND TRADEMARK OFFICE
CERTIFICATE OF CORRECTION

PATENT NO. : 5,774,284
DATED : June 30, 1998
INVENTOR(S) : AKIRA EGAWA

It is certified that error appears in the above-identified patent and that said Letters Patent is hereby corrected as shown below:

<u>COLUMN 12</u>

Line 22, "edge-clock" should read --edge - clock--.
    Line 24, "edge-data" should read --edge - data--.

<u>COLUMN 14</u>

Line 46, "edge-data" should read --edge - data--.
    Line 47, "edge-clock" should read --edge - clock--.

Signed and Sealed this

Fourth Day of May, 1999

Q. TODD DICKINSON

*Attest:*

*Attesting Officer*    *Acting Commissioner of Patents and Trademarks*